Nov. 28, 1967 D. E. SEMONES ET AL 3,355,326
METHOD OF PREPARING ELECTRODES
Filed June 3, 1963

INVENTORS
DONALD E. SEMONES
WALTER E. CHASE
BY Gray, Mase & Dunson
ATTORNEYS 3,355,326
METHOD OF PREPARING ELECTRODES
Donald E. Semones, Worthington, and Walter E. Chase, Columbus, Ohio, assignors to Battelle Memorial Institute, Columbus, Ohio, a corporation of Ohio
Filed June 3, 1963, Ser. No. 285,042
4 Claims. (Cl. 136—86)

This invention relates to methods of preparing fuel electrodes for use in fuel cells. The methods of the present invention are especially useful in preparing two-layer fuel electrodes for low-temperature fuel cells.

In the past it has been considered desirable to coat fuel cell electrodes made of carbon with paraffin or other wetproofing material to *reduce* the wettability of the surface of the electrode. It has been discovered in the present invention, however, that *increasing* the wettability of the otherwise substantially hydrophobic carbon surface layer in a fuel electrode provides superior current capacity, particularly at low temperatures and low pressures.

A method according to the present invention of preparing a fuel electrode for use in a fuel cell comprises affixing a surface layer of catalyzed porous carbon to a porous supporting member of conductive material, placing the electrode thus made in contact with an electrolyte, and activating the surface layer to increase its wettability. In preparing the electrode, microporous powdered carbon for the surface layer preferably is catalyzed by impregnating it with a solution of platinum. The surface layer may be activated by saturating it with the electrolyte or by passing current through the electrode and the electrolyte for a substantial time.

A preferred way to saturate the electrode is to force the electrolyte, as by gas pressure, through the porous supporting member and into the surface layer. The electrochemical activation may be cathodic, with the electrode connected to the negative terminal of a voltage source such that electrochemical reduction takes place at the electrode; or anodic, with the polarity reversed, such that oxidation takes place. The cathodic activation is somewhat more effective than the anodic activation.

Figure 1:
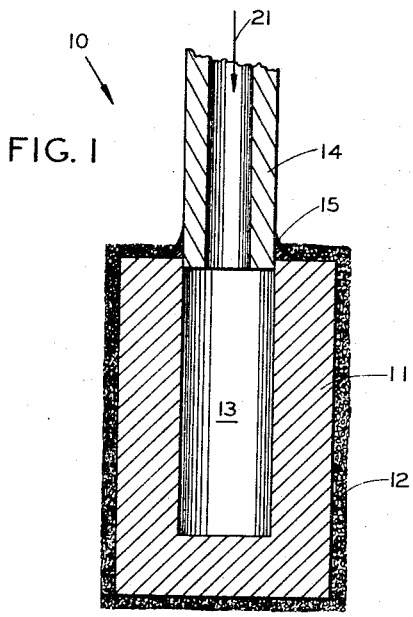
FIG. 1 is an elevational view in cross section showing a typical electrode as prepared by the method of the present invention.

Referring to FIG. 1, a typical electrode 10 according to the present invention comprises a porous supporting member 11 of conductive material and a surface layer 12 of porous carbon affixed thereto. The supporting member 11 is shown in the shape of a hollow cylinder closed at its lower end and open at its upper end. At the upper end of the cylindrical chamber 13 in the supporting member 11 is affixed a hollow tube 14 of copper or other strong conductive material. The tube 14 fits snugly in the supporting member 11, making good electrical contact therewith. A gas-tight seal 15 of epoxy resin or other suitable sealing material is provided at the joint between the porous supporting member 11 and the metal tube 14.

The supporting member 11 may be made of porous carbon such as is available commercially from a number of manufacturers or of porous metals such as nickel, stainless steel, or other materials commonly used in electrodes for fuel cells. The total porosity should be about 25 to 60 percent, preferably about 33 to 48 percent, with most of the pores having diameters in the range of about 10 to 70 microns. Typical supporting members 11 of porous carbon are made about 1/8 inch to 1/4 inch thick. Metal supporting members 11 can be made somewhat thinner. To conserve space and material, it is preferred that the supporting members 11 be fairly thin.

The surface layer 12 may comprise any of the microporous activated carbons commercially available having surface areas in the range of about 200 to 1,000 square meters per gram. (The term "activated carbon" is widely and normally used to mean "microporous carbon." Because this is the established term for such material, it is used in its ordinary sense herein. It should be noted, however, that the term does not have anything to do with the activation of the surface layer of the electrode in this invention.) It is preferred to use particles of mixed sizes ranging from about 1 to 190 microns in diameter. Various mixtures having narrower ranges of size within this broad range may also be used. Larger particles may also be used, but performance is not as good with larger particles. For high current densities, most of the pores in the carbon particles of the surface layer 12 should have diameters in the range of about 10 to 300 angstroms. The surface layer 12 may be from about 0.004 to 0.08 inch thick; preferably about 0.04 to 0.08 inch thick, as a thicker layer lasts longer. The surface layer 12 may be made thicker than 0.08 inch where desired for long life.

The activated carbon particles are catalyzed with a material such as the decomposition product of chloroplatinic acid in air in amounts ranging from about 0.1 to 7 percent of the weight of the carbon particles, preferably around 5 percent. A platinum catalyst may also be provided by reduction of chloroplatinic acid in a hydrogen atmosphere at elevated temperature (about 350° C.), or by any of the other well-known chemical reduction methods. If desired, other catalysts, such as palladium deposited from an aqueous solution of palladium chloride, may be substituted.

Natural pale crepe rubber is a preferred binder material for holding the microporous carbon particles together and for affixing them to the supporting member 11. Other alkaline-resistant rubbers are also suitable, as are plastic binders such as polyethylene and polystyrene dispersed in solvents such as benzene.

If desired, a two-layer carbon structure may be compacted as by compressing the carbon particles onto a porous carbon support in an inert atmosphere at elevated temperature, using a natural carbon binder such as pitch that decomposes during the process. The catalyst may be impregnated into the formed structure, or the carbon powder may be catalyzed as described above before it is compacted.

To prepare the electrode 10 for use in a fuel cell, it is placed in contact with an electrolyte and the surface layer 12 is activated to increase its wettability. Various electrolytes may be used in the activation as well as in the fuel cell in which the electrode 10 is used. A preferred electrolyte comprises a 30 percent solution by weight of potassium hydroxide in water. Other concentrations, preferably about 20 to 50 percent (4 N to 15 N), may also be used, as may various concentrations of sodium hydroxide in water. Where desired, other electrolytes of various pH values from highly acidic through neutral to strongly caustic may be used.

A preferred method of activating the surface layer 12 of the electrode 10 comprises saturating it with the electrolyte. This is readily done by placing electrolyte in the chamber 13 and forcing it through the porous supporting member 11 and into the surface layer 12 as by gas pressure applied through the metal tube 14. The electrode 10 may be placed in an electrolyte 20, as in FIG. 3 (disregarding the electrical connections), before beginning the activation process. In fact, the process may be carried out in the fuel cell in which the electrode 10 is to be used. Any suitable gas, such as hydrogen or other gaseous fuel used in the fuel cell, is supplied to the metal tube 14, as is indicated by the arrow 21, and the pressure is increased sufficiently to force the electrolyte through the supporting member 11 and into the surface layer 12 until bubbles are first observed around the electrode 10. Then the pressure is reduced slightly to avoid forcing the electrolyte on through the surface layer 12.

Figure 2:
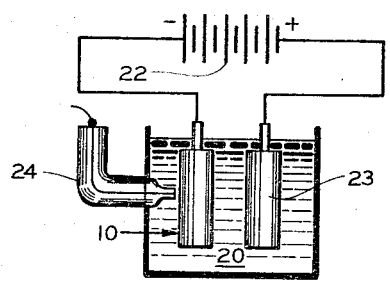
FIG. 2 is a diagrammatic view illustrating cathodic activation according to the present invention.
Figure 3:
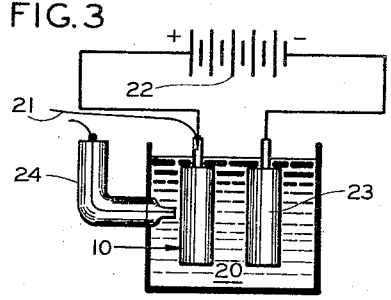
FIG. 3 is a diagrammatic view illustrating anodic activation according to the present invention.

The surface layer may be activated also by passing current through the electrode 10 and the electrolyte 20 for a substantial time, as is illustrated in FIGS. 2 and 3. In FIG. 2, the electrode 10 is connected to the negative terminal of a direct current supply 22, the positive terminal of which is connected to a counterelectrode 23 in the electrolyte 20. The counterelectrode 23 may be made of any convenient conductive material such as ordinary porous carbon or other inert material such as platinum. Thus, the electrode 10 is connected to a voltage that is negative with respect to the potential in the electrolyte 20, and is a cathode in the circuit of FIG. 2.

In FIG. 3, the electrode 10 is connected to the positive terminal of the direct current supply 22, the negative terminal of which is connected to the counterelectrode 23. The counterelectrode 23 may be made of any convenient conductive material such as ordinary porous carbon or conventional depolarizers such as mercuric oxide. Thus, the electrode 10 is connected to a voltage that is positive with respect to the potential in the electrolyte 20, and is an anode in the circuit of FIG. 3. During the anodic activation, hydrogen is supplied to the electrode 10 at very low pressure, less than 0.035 pound per square inch gauge, as is indicated by the arrow 21 in FIG. 3.

*Example*

Several hollow cylindrical supporting members 11, as in FIG. 1, were made of plain porous carbon having pores ranging in diameter from about 10 to 70 microns and having a total porosity of about 48 percent. Each supporting member 11 was ½ inch in outer diameter and one inch long. The chamber 13 was ¼ inch in diameter and 13/16 inch long.

A slurry comprising about 20 grams of microporous powdered activated carbon in 56 cubic centimeters of a 5 percent solution by weight of chloroplatinic acid in water was placed in an evaporating dish and dried in an oven at about 170° C. for about 22 hours. The dried platinum-coated carbon was mixed in an equal amount by weight of a solution comprising 10 percent by weight of gum rubber in benzene. The mixture was then diluted with approximately an equal amount of benzene. While each supporting member 11 was maintained at a temperature of about 45 to 50° C. by an infrared heat lamp, the diluted mixture was brushed onto the outer surface in several thin layers, each being partially dried before applying the next layer, forming a total surface layer about 0.06 inch thick, which was dried at about 50° C. for about an hour.

A copper tube 14 plated with silver was fitted in tight electrical and mechanical contact with each electrode, as shown in FIG. 1, and the joint between the tube 14 and the supporting member 11 was sealed with an epoxy resin 15 as in FIG. 1. Each electrode 10 was placed in an electrolyte 20 comprising a solution of about 30 percent by weight of potassium hydroxide in water.

(A) Some of the electrodes were activated by *saturating* the surface layer 12 with the electrolyte 20. The chamber 13 was filled with electrolyte 20 and hydrogen was supplied to the tube 14, as indicated by the arrow 21 in FIG. 1, at a pressure of about one pound per square inch gauge, forcing the electrolyte 20 through the porous supporting member 11 and into the surface layer 12. Some of the electrolyte 20 passed completely through the surface layer 12, contacting the electrolyte 20 surrounding the electrode 10. The remainder of the electrolyte 20 that was forced through the supporting member 11 remained in the outer portion of the surface layer 12.

(B) Other electrodes 10 were activated *cathodically* as in FIG. 2. The counterelectrode 23 was an ordinary porous carbon support without any outer layer. The direct current source 22 was adjusted to provide a current density of about 50 milliamperes per square centimeter (one ampere total). The cathodic treatment lasted 44 minutes, for a total charge of about 44 ampere minutes. The voltage between the electrode 10 and a commercial saturated calomel electrode 24 was about 1.36 volts. During the cathodic treatment, hydrogen gas evolved at the surface of the electrode 10.

(C) Other electrodes 10 were activated *anodically* as in FIG. 3. The counterelectrode 23 again was an ordinary porous carbon support. The direct current source 22 was adjusted to provide a current density of about five milliamperes per square centimeter with a hydrogen inlet pressure to the chamber 13 of less than 0.035 pound per square inch gauge. The anodic treatment lasted about one minute; long enough to polarize about 0.55 to 0.65 volt from the normal open-circuit voltage of 1.1 volts versus the saturated calomel reference electrode 24. Thus the voltage between the electrodes 10 and 24 was about 0.55 to 0.45 volt.

(D) Still other electrodes 10 were *not activated*.

Each electrode 10 prepared as described in Paragraphs A, B, C, or D above was evaluated as a fuel electrode for a fuel cell, by supplying hydrogen through the tube 14 into the chamber 13 through the porous supporting member 11 and into the surface layer 12, and measuring the voltage between the electrode 10 and a saturated calomel reference electrode 24 at various current densities, as in FIG. 3. The electrolyte 20, the same composition as was used in activation, was maintained at a temperature of about 20 to 30° C. The hydrogen was supplied to the activated electrodes 10 (Paragraphs A, B, and C) at pressures of about one to three pounds per square inch gauge. Most of the hydrogen bubbled through the unactivated electrodes 10 (Paragraph D) into the electrolyte 20 and was wasted at pressures above 0.2 pound per square inch gauge, and current was not improved by increasing the pressure above 0.2 per square inch gauge. So hydrogen was supplied at pressures of about 0.03 to 0.2 per square inch gauge to the unactivated electrodes 10 (Paragraph D).

Figure 4:
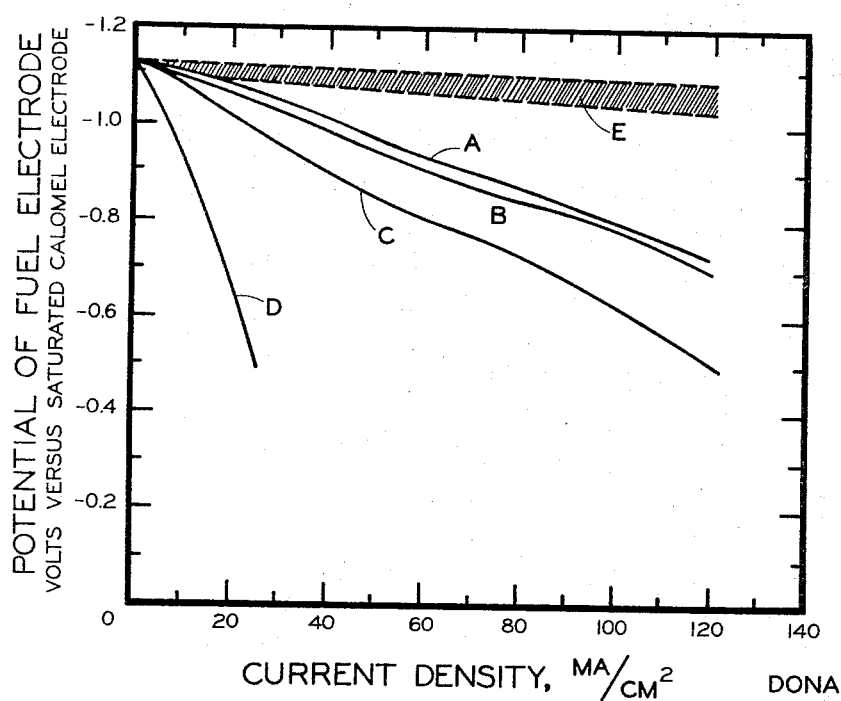
FIG. 4 is a graph showing the superior results provided by the present invention.

FIG. 4 shows the results graphically. Each curve represents the potential of one type of electrode in volts with respect to the saturated calomel reference electrode, as a function of the current density through the electrode in milliamperes per square centimeter. The curve A shows the voltage as a function of current density for the electrodes that were activated by saturating the surface layer with electrolyte, as described in Paragraph A above. The curve B shows the voltage as a function of current density for the electrodes that were activated cathodically, as described in Paragraph B above. The curve C shows the voltage as a function of current density for the electrodes that were activated anodically, as described in Paragraph C above. The curve D shows the voltage as a function of current density for the electrodes that were not activated, as mentioned in Paragraph D above.

From FIG. 4, it is apparent that activating the surface layer to increase its wettability provides greatly increased current capacity in the electrode. With the unactivated electrodes, curve D, the voltage dropped to −0.5 at a current density of only 25 milliamperes per square centimeter. At the same current density, the activated electrodes, Curves A, B, and C, provided voltages of −0.97 to −1.08 volts. The activated electrodes provided useful voltages at current densities up to at least 120 milliamperes per square centimeter. The electrodes that were activated by saturation, curve A, and those activated cathodically, curve B, provided somewhat higher voltages than did the electrodes that were activated anodically, curve C. Thus the preferred forms of activation are the forced saturation and the cathodic activation. The anodic activation, while not quite as effective, nevertheless also provides results vastly superior to those obtainable with no activation.

In other similar tests the activated fuel electrodes have supported current densities as high as 200 milliamperes per square centimeter at fuel pressures of 0.1 to 10 pounds per square inch gauge and temperatures of 70 to 85° F. The shaded area E in FIG. 4 shows a typical range of performances of such electrodes with the voltages corrected for the IR drops in the circuit, mostly in the electrolyte 20. As is shown in FIG. 4, area E, the corrected potential remained as high as 1.02 to 1.08 at 120 milliamperes per square centimeter. At 200 milliamperes per square centimeter it was still at least 0.98 volt.

Where desired, fuels other than hydrogen, such as methanol, ethanol, and other carbonaceous fuels, may be used in fuel cells having fuel electrodes according to this invention.

Where fuel cells are not expected to be used immediately after they are made, the electrodes need not be activated until the cells are about to be used. The fuel cells can be constructed and handled in much the same ways as are the ordinary dry-charge batteries.

It is realized that various modifications of the invention may be made without departing from the spirit and scope thereof and without the exercise of further invention. No attempt is here made to list such possibilities. It will be understood that the words used herein are terms of description rather than of limitation, and that various changes may be made without departing from the spirit or scope of the invention.

What is claimed is:

1. A method of preparing a fuel electrode for use in a fuel cell that comprises affixing a surface layer of catalyzed porous carbon to a porous supporting member of conductive material, placing the electrode thus made in an electrolyte having substantially the composition of the electrolyte in said fuel cell, activating said surface layer to increase its wettability by forcing a predetermined amount of said electrolyte through said porous supporting member and into said surface layer and thereby saturating said surface layer with said electrolyte, and then utilizing said electrode in said fuel cell to generate current.

2. A method according to claim 1, wherein some of said electrolyte is forced completely through said surface layer and the rest remains in the outer portion of said surface layer.

3. A method according to claim 1, wherein said electrolyte is forced by gas pressure through said porous supporting member and into said surface layer.

4. A method according to claim 3, wherein said gas pressure is made sufficient to force said electrolyte through said supporting member and into said surface layer until bubbles first appear on said surface layer.

References Cited

UNITED STATES PATENTS

| | | | |
|---|---|---|---|
| 362,639 | 5/1887 | Ludlow | 136—86.5 X |
| 2,925,454 | 2/1960 | Justi et al. | 136—86 |
| 3,097,974 | 7/1963 | McEvoy et al. | 136—86 X |
| 3,207,682 | 9/1965 | Oswin et al. | 136—86 X |
| 3,223,556 | 12/1965 | Cohn et al. | 136—86 |

WINSTON A. DOUGLAS, *Primary Examiner.*

ALLEN B. CURTIS, *Examiner.*

N. P. BULLOCH, *Assistant Examiner.*